US010067628B2

(12) United States Patent
Kuscher et al.

(10) Patent No.: US 10,067,628 B2
(45) Date of Patent: Sep. 4, 2018

(54) PRESENTING OPEN WINDOWS AND TABS

(71) Applicant: Google Inc., Moutain View, CA (US)

(72) Inventors: Alexander Friedrich Kuscher, San Francisco, CA (US); Jennifer Shien-Ming Chen, San Francisco, CA (US); Andy Warr, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 13/967,290

(22) Filed: Aug. 14, 2013

(65) Prior Publication Data

US 2015/0052473 A1 Feb. 19, 2015

(51) Int. Cl.
*G06F 3/0481* (2013.01)
*G06F 3/0488* (2013.01)

(52) U.S. Cl.
CPC ........ *G06F 3/0481* (2013.01); *G06F 3/04883* (2013.01); *G06F 2203/04803* (2013.01); *G06F 2203/04808* (2013.01)

(58) Field of Classification Search
CPC .................................................. G06F 3/0481
USPC ....................................................... 715/777
See application file for complete search history.

(56) References Cited

U.S. PATENT DOCUMENTS

| 5,305,435 A | 4/1994 | Bronson | |
| 6,166,736 A * | 12/2000 | Hugh | G06F 3/0481 |
| | | | 715/777 |
| 2003/0117440 A1 * | 6/2003 | Hellyar | G06F 3/0235 |
| | | | 715/767 |
| 2009/0007004 A1 | 1/2009 | Holecek et al. | |
| 2010/0107115 A1 | 4/2010 | Sareen et al. | |
| 2010/0153544 A1 | 6/2010 | Krassner et al. | |

(Continued)

FOREIGN PATENT DOCUMENTS

| CN | 102257485 A | 11/2011 |
| KR | 10-2011-0084194 A | 7/2011 |

(Continued)

OTHER PUBLICATIONS

How to Use Flip and Flip 3D in Windows 7 by Greg Harvey available at http://www.dummies.com/computers/operating-systems/windows-7/how-to-use-flip-and-flip-3d-in-windows-7/ as of Oct. 27, 2009.*

(Continued)

*Primary Examiner* — William Bashore
*Assistant Examiner* — Nathan Shrewsbury
(74) *Attorney, Agent, or Firm* — Brake Hughes Bellerman LLP (57) ABSTRACT

Systems and methods for presenting open windows and tabs are provided. In some aspects, multiple window indicators are presented, at a display of a computing device having multiple open windows, where each window indicator indicates content for a respective window of the multiple open windows, and where a first window from among the multiple open windows includes multiple open tabs. Multiple tab indicators are presented, at the display of the computing device, in conjunction with the window indicator of the first window and while continuing to present the multiple window indicators, where each tab indicator indicates content for a respective tab of the multiple open tabs.

20 Claims, 6 Drawing Sheets

(56) References Cited

U.S. PATENT DOCUMENTS

| | | | |
|---|---|---|---|
| 2010/0153836 A1 | 6/2010 | Krassner et al. | |
| 2010/0309147 A1* | 12/2010 | Fleizach | G06F 3/04883 345/173 |
| 2012/0198381 A1 | 8/2012 | Kumamoto | |
| 2013/0086507 A1* | 4/2013 | Poston et al. | 715/777 |
| 2014/0082555 A1* | 3/2014 | Wallace | G06F 3/03549 715/830 |

FOREIGN PATENT DOCUMENTS

| | | |
|---|---|---|
| WO | 2012/166183 A1 | 12/2012 |
| WO | 2013116219 A1 | 8/2013 |
| WO | 2015/023377 A1 | 2/2015 |

OTHER PUBLICATIONS

International Search Report and Written Opinion for PCT Application No. PCT/US2014/046207, dated Oct. 27, 2014, 6 pages.

International Preliminary Report on Patentability received for PCT Patent Application No. PCT/US2014/046207, dated Feb. 25, 2016, 6 pages.

Office Action with English Translation from JP2016-519394, dated Aug. 2, 2016, dated 8 pages.

Notice of Allowance with English Translation for Japanese Application No. 2016-519394, dated Nov. 8, 2016, 2 pages.

Office Action with English Translation for Korean Application No. 10-2016-7006062, dated Oct. 28, 2016, 10 pages.

Extended European Search Report from EP14836599.2, dated Nov. 21, 2016, 7 Pages.

Office Action Received for Korean Patent Application No. 10-2016-7006062, dated May 30, 2016, 5 pages. (Official copy only).

Office Action with English Translation from CN201480050253.8, dated Nov. 23, 2016, 10 pages.

Final Office Action with English Translation from KR10-2016-7006062, dated Feb. 8, 2017, 6 pages.

\* cited by examiner

PRESENTING OPEN WINDOWS AND TABS

BACKGROUND

The subject technology generally relates to user interfaces for computers and, in particular, relates to presenting open windows and tabs.

A user of a computer may wish to navigate from a first window to a tab in a second window. In order to complete this navigation, the user may need to locate a button corresponding to the second window, select the button to place focus on the second window, and, after focus is on the second window, review the tabs of the second window to select a desired tab.

SUMMARY

In some aspects, the disclosed subject matter relates to a computer-implemented method for presenting open windows. The method includes presenting, at a display of a computing device having multiple open windows, multiple window indicators, where each window indicator indicates content for a respective window of the multiple open windows, and where a first window from among the multiple open windows includes multiple open tabs. The method includes presenting, at the display of the computing device, in conjunction with the window indicator of the first window and while continuing to present the multiple window indicators, multiple tab indicators, where each tab indicator indicates content for a respective tab of the multiple open tabs has a corresponding tab indicator that indicates a content of the tab.

In some aspects, the disclosed subject matter relates to a non-transitory computer-readable medium encoded with executable instructions presenting open windows by a computing device having multiple open windows. The instructions include code for signaling a display unit to present multiple window indicators, where each window indicator indicates content for a respective window of the multiple open windows has a corresponding window indicator that indicates a content of the window, and where a first window from among the multiple open windows includes multiple open tabs. The instructions include code for signaling the display unit to present, in conjunction with the window indicator of the first window and while continuing to present the multiple window indicators, multiple tab indicators, where each tab indicator indicates content for a respective tab of the multiple open tabs has a corresponding tab indicator that indicates a content of the tab.

In some aspects, the disclosed subject matter relates to a computer. The computer includes an input device, a display device, one or more processors, and a memory. The memory includes instructions. The instructions include code for receiving, via the input device, a request for presenting open windows. The instructions include code for presenting, at the display device, multiple window indicators, where each window indicator indicates content for a respective window of multiple open windows, and where a first window from among the multiple open windows includes multiple open tabs. The instructions include code for presenting, at the display device, in conjunction with the window indicator of the first window and while continuing to present the multiple window indicators, multiple tab indicators, where each tab indicator indicates content for a respective tab in the multiple open tabs.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

The navigation described above may include entering an overview mode, in order to determine which windows are open on the computer. The overview mode may include presenting buttons corresponding to each of the open windows. The scheme described above involves several steps and may take a few seconds to complete. As the foregoing illustrates, a new approach for navigating to a tab in a window may be desirable.

As set forth above, an overview mode may be used in order to determine which windows are open on the computer. The overview mode may include presenting buttons corresponding to each of the open windows. However, the overview mode does not indicate which tabs, if any, are open within the open windows. As different tabs within a window may include different content, an overview mode that includes indicia of the content of the tabs that are open within window(s) may be desirable. Such an overview mode may allow for, among other things, faster navigation to the tab(s) presented using the overview mode and a faster technique for a user to obtain knowledge about the content of window(s) and tab(s) open on a computing device.

According to some implementations, the computing device receives, from the user, a request for presenting an overview of open windows. For example, the user may hit a hotkey on a keyboard or a touchscreen. The computing device has multiple open windows. A first window from among the multiple open windows has multiple open tabs. The computing device presents, in response to the request for presenting the overview of open windows, at the display of the computing device, multiple window indicators. Each window in the multiple open windows has a corresponding window indicator that indicates a content of the window. For example, the window indicator may be a thumbnail of the content of the window. The computing device presents, at the display of the computing device and in conjunction with the window indicator for the first window, multiple tab indicators. Each tab in the multiple open tabs of the first window has a corresponding tab indictor that indicates a content of the tab. For example, the tab indicator may be a thumbnail of the content of the tab.

According to some implementations, the computing device receives, from the user, a selection of one of the multiple tab indicators of the first window. For example, the user may click the one of the multiple tab indicators using a mouse or touch the one of the multiple tab indicators using a touchscreen. In response to the selection of the one of the multiple tab indicators, the computing device exits the overview mode and brings focus on the first window and a tab in the first window corresponding to the one of the multiple tab indicators. A component of a user interface is considered to have focus if the component is selected to receive input. Specifically, focus may be on a window or a tab if the window or the tab is an active window that is displayed at the display device and into which commands may be entered by the user without explicitly selecting the window or the tab. Otherwise, focus may not be on the window or the tab.

Figure 1A:
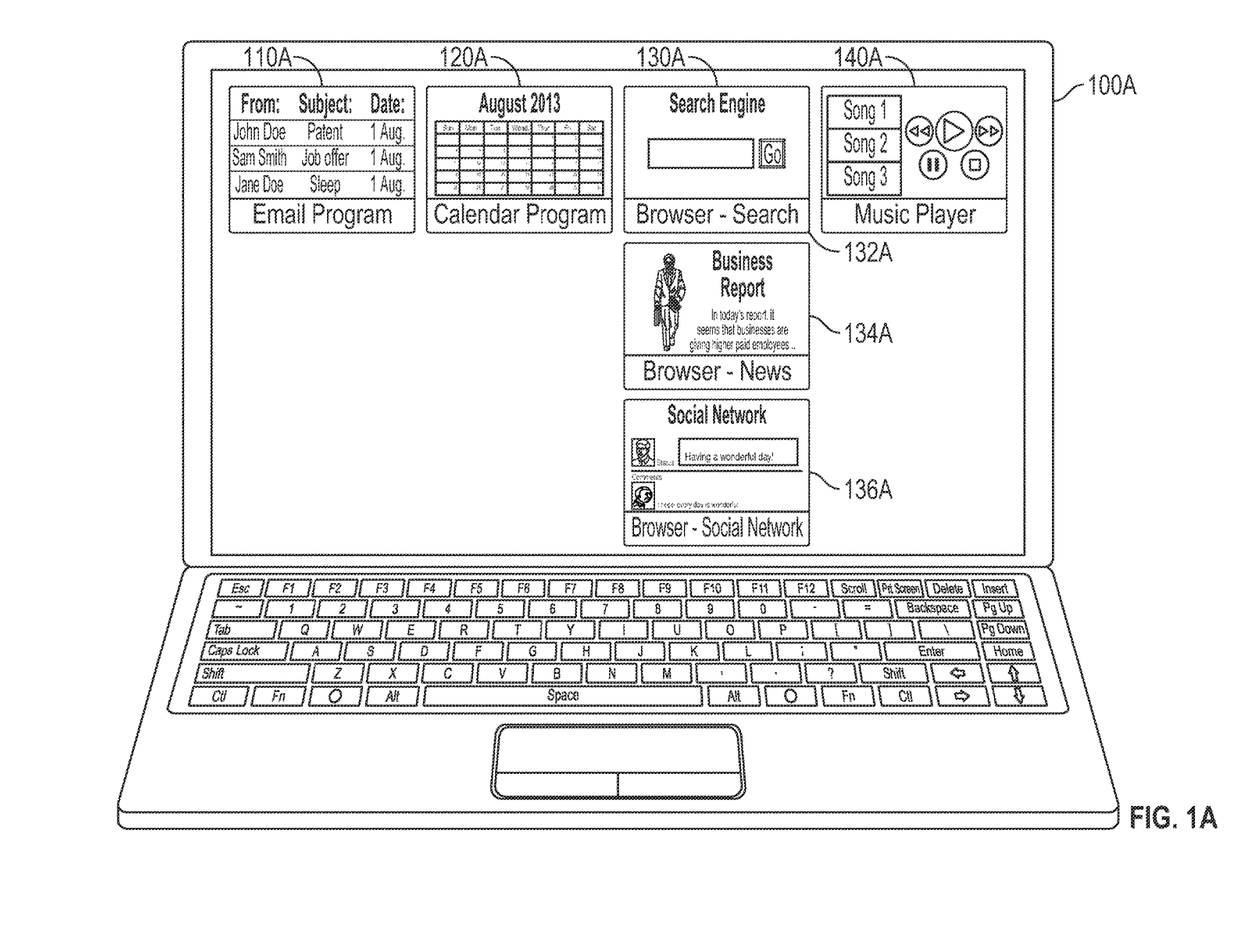
FIGS. 1A-1C illustrate example interfaces presenting an overview of open windows and tabs.
Figure 1B:
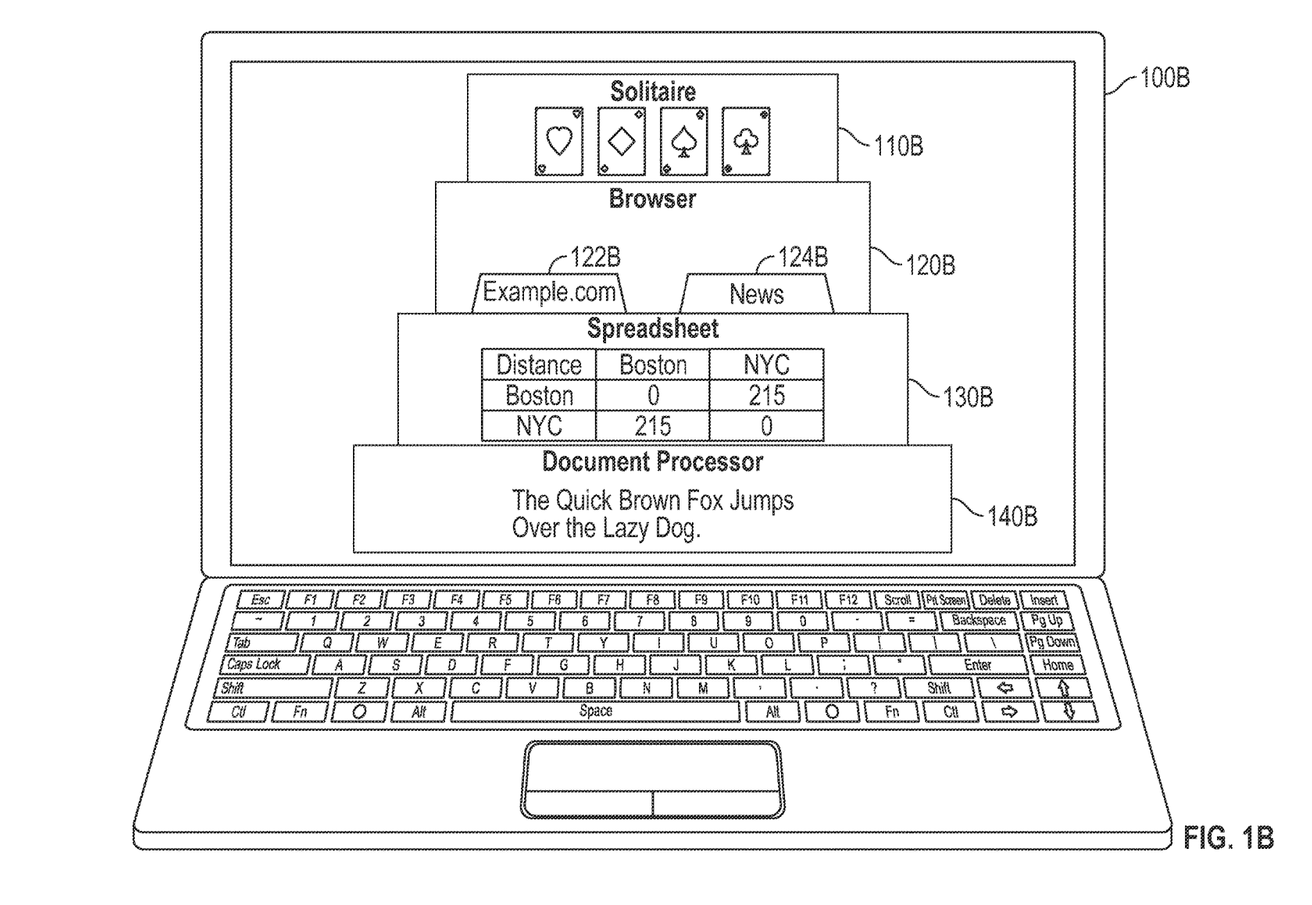
Figure 1C:
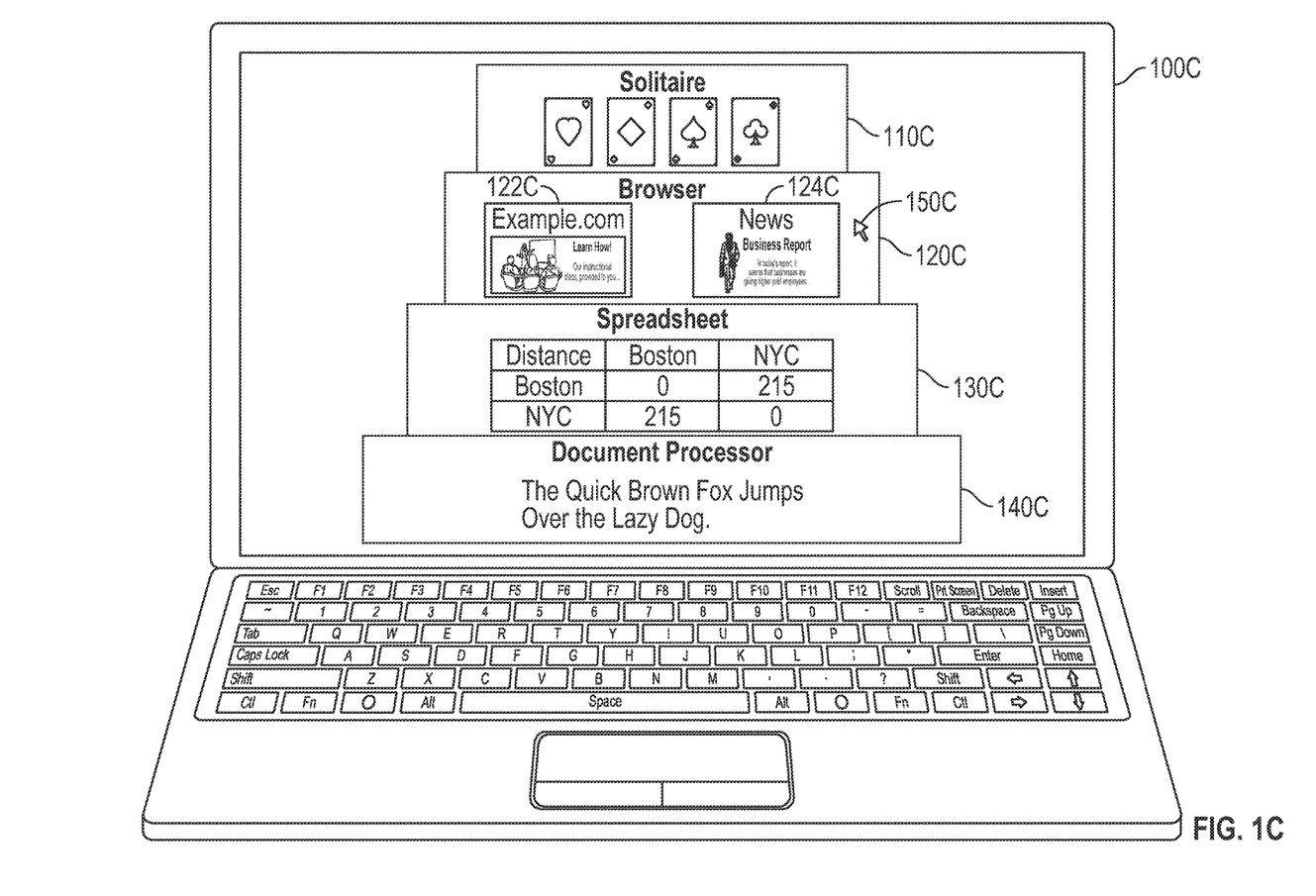

FIGS. 1A-1C illustrate example interfaces 100A, 100B, and 100C presenting an overview of open windows and tabs. The example interfaces 100A, 100B, and 100C may be presented upon the computing device receiving, from the user, a request for presenting an overview of open windows.

As shown in FIG. 1A, the interface 100A includes window indicators 110A, 120A, 130A, and 140A of multiple windows. While four window indicators 110A, 120A, 130A, and 140A are shown, the subject technology may be implemented with any number of window indicators. As shown, the window indicators 110A, 120A, 130A, and 140A include thumbnails of the contents of the windows and a title of the application associated with the window. For example, indicator 110A includes a thumbnail of an email program and a title "Email Program." The window indicators 110A, 120A, 130A, and 140A correspond to windows that are open on the illustrated computer and may include window(s) on which there is focus, window(s) on which there is not focus and which are not minimized, or minimized window(s). Any of the windows corresponding to the window indicators 110A, 120A, 130A, or 140A may gain focus by selecting the corresponding window indicator. A window may be minimized if the window is open at a computing device but not displayed at the display device of the computing device. A user may minimize a window by bringing focus on the window and selecting a minimize button, which causes the window to be minimized and to lose focus.

Window indicator 130A corresponds to a browser application that has multiple tabs: "Search," "News," and "Social Network." The window indicator 130A includes multiple tab indicators 132A, 134A, and 136A. While three tab indicators 132A, 134A, and 136A are illustrated, the subject technology may be implemented with any number of tab indicators. Each of the tabs of the browser window corresponding to window indicator 130A has an associated tab indicator—tab indicator 132A for the "Search" tab, tab indicator 134A for the "News" tab, and tab indicator 136A for the "Social Network" tab. Each tab indicator 132A, 134A, and 136A includes a thumbnail of the contents of the tab and a title of the tab. For example, tab indicator 132A shows a thumbnail of a webpage of a search engine and the title "Search."

In FIG. 1A, only a single window, corresponding to the browser window indicator 130A is shown to have multiple tabs. However, any number of windows may have multiple tabs and, thus, may have multiple tab indicators. For example, the email program window indicator 110A, the calendar program window indicator 120A, or the music player window indicator 140A may have multiple tab indicators.

As shown in FIG. 1B, the interface 100B includes window indicators 110B, 120B, 130B, and 140B arranged in a pyramid-like structure. The window indicators 110B, 120B, 130B, and 140B include a solitaire window indicator 110B, a browser window indicator 120B, a spreadsheet window indicator 130B, and a document processor window indicator 140B. Each of the window indicators 110B, 120B, 130B, and 140B includes a thumbnail of the content of the corresponding window and the titles of the corresponding window. For example, window indicator 110C includes a thumbnail of the content of the Solitaire window and the title, "Solitaire." The browser window indicator 120B includes tab indicators 122B and 124B, which include an Example.com tab indicator 122B and a XYZ News tab indicator 124B. However, as shown in FIG. 1B, the tab indicators 122B and 124B do not illustrate the content of the corresponding tabs. If the user is interested in the browser window indicator 120B and the contents of the tabs corresponding to the tab indicators 122B or 124B, the user may hover a cursor over the browser window indicator 120B, as illustrated in detail in FIG. 1C.

FIG. 1C illustrates the interface 100C. The interface 100C is similar to the interface 100B, as the window indicators 110C, 120C, 130C, and 140C are arranged in a pyramid-like structure and each window indicator includes a title of the window and a thumbnail of a content of the window. As shown in FIG. 1C, the user is hovering a cursor 150C over browser window indicator 120C. In response to the hovering of the cursor 150C, the tab indicators 122C and 124C are expanded, relative to the tab indicators 122B and 124B, to include a thumbnail of a content of the corresponding tab and a title of the corresponding tab. In some implementations, an input different from hovering the cursor 150C may be used to cause the interface 100B to transform into the interface 100C. For example, on a touchscreen, a single touch or a touch-and-hold of the browser window indicator 120B may cause the interface 100B to transform into the interface 100C.

In FIGS. 1B-1C, the window indicators 110B, 120B, 130B, 140B, 110C, 120C, 130C, and 140C correspond to windows that are open on the illustrated computer and may include window(s) on which there is focus, window(s) on which there is not focus and which are not minimized, or minimized window(s). Any of the windows corresponding to the window indicators 110B, 120B, 130B, 140B, 110C, 120C, 130C, or 140C may gain focus by selecting the corresponding window indicator. FIGS. 1B-1C include interfaces 100B and 100C associated with four open windows and two tabs in one of the windows (corresponding to window indicator 120B and 120C). However, the subject technology may be implemented with any number of open windows and one or more of the windows having any number of multiple tabs.

FIGS. 1A-1C illustrate the interfaces 100A, 100B, and 100C being presented at a laptop computer. However, any other computing device may be used to present the interfaces 100A, 100B, or 100C. For example, the interfaces 100A, 100B, or 100C may be presented at a display of a desktop computer, a tablet computer, a mobile phone, a personal digital assistant (PDA), or an electronic music player. Also, FIGS. 1A-1C illustrate a single window—a browser window corresponding to window indicator 130A, 120B, or 120C—as having multiple open tabs and other windows as having a single open tab for each window. However, in some implementations, multiple windows may have multiple tabs and zero, one, or more than one window(s) may have multiple tabs. For example, a browser application, a document processor application, a spreadsheet application, a calendar application, a music player application, an email application, or a gaming application may have a single open tab or multiple open tabs. In some implementations, a spreadsheet application has multiple tabs, with each tab corresponding to a different page of the spreadsheet.

Figure 2:
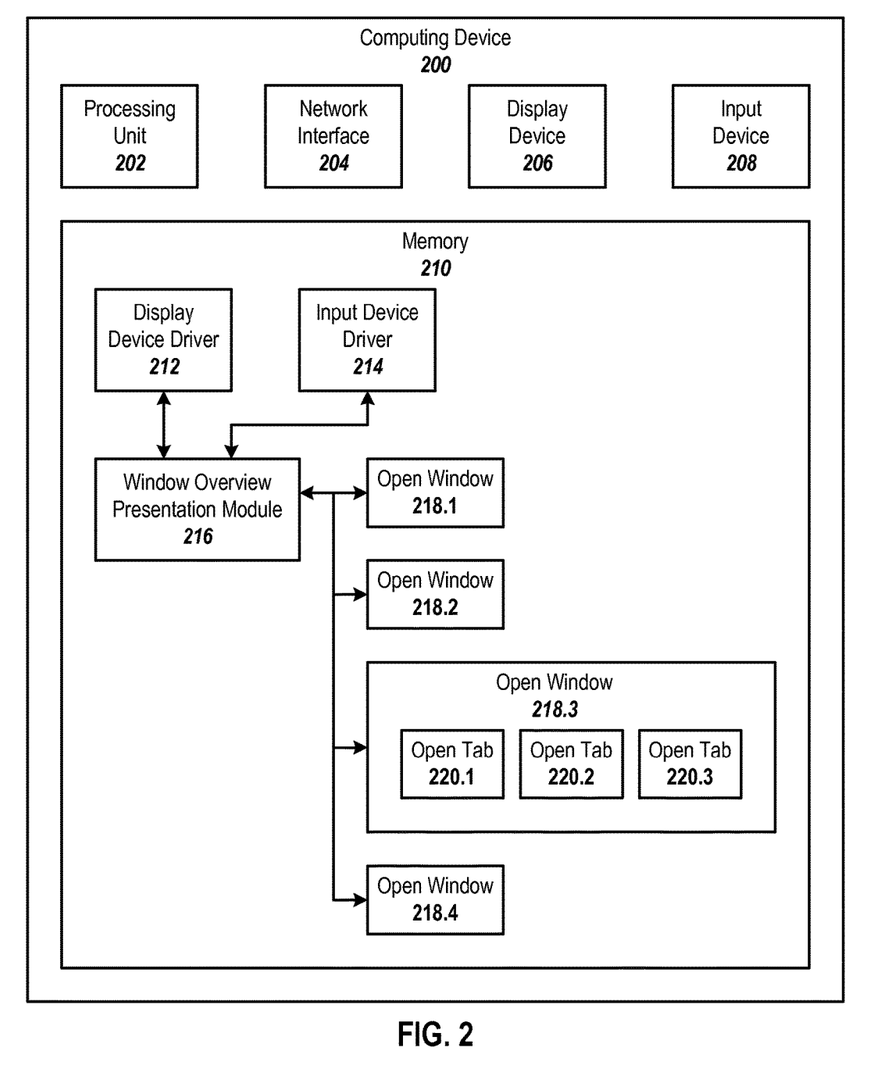
FIG. 2 illustrates an example of a computing device for presenting an overview of open windows and tabs.

FIG. 2 illustrates an example of a computing device 200 for presenting an overview of open windows and tabs. The computing device 200 may be a laptop computer, a desktop computer, a tablet computer, a mobile phone, a personal digital assistant (PDA), an electronic music player, etc.

As shown, the computing device 200 includes a processing unit 202, a network interface 204, a display device 206, an input device 208, and a memory 210. The processing unit 202 includes one or more processors. The processing unit may include a central processing unit (CPU), a graphics processing unit (GPU), or any other processing unit. The processing unit 202 is configured to execute computer instructions that are stored in a computer-readable medium, for example, the memory 210. The network interface 204 is configured to allow the web server 120 to transmit and receive data in a network, e.g., the Internet, a cellular network, a local area network (LAN), a wide area network (WAN), a WiFi network, etc. The network interface 204 may include one or more network interface controllers (NICs). The display device 206 is configured to display information from the computing device 200 to a user of the computing device 200. For example, the display device may be configured to display one or more of the interfaces 100A, 100B, or 100C, as described in conjunction with FIGS. 1A-1C. The display device 206 may be a component of the computing device 200 or may be coupled to the computing device 200 and reside externally to the computing device 200. The display device may include one or more of a monitor, a projector, a screen, or a touchscreen. The input device 208 is configured to allow a user of the computing device 200 to provide input to the computing device 200. The input device 208 may be a component of the computing device 200 or may be coupled to the computing device 200 and reside externally to the computing device 200. The input device 208 may include one or more of a single-touch trackpad, a multi-touch trackpad, a mouse, a keyboard, or a touchscreen. While the display device 206 and the input device 208 are illustrated as separate devices, both may be implemented as a single device, for example, a single-touch touchscreen or a multi-touch touchscreen.

The memory 210 stores data and/or instructions. The memory 210 may be one or more of a cache unit, a storage unit, an internal memory unit, or an external memory unit. As illustrated, the memory 210 includes a display device driver 212, an input device driver 214, an window overview presentation module 216, and open windows 218.1-4.

The display device driver 212 is coupled with the display device 206. The display device driver 212 is configured to transmit data to the display device 206 for presentation at the display device 206. The input device driver 214 is coupled with the input device 208. The input device drive 214 is configured to receive input data (e.g., movement information, key press information, or touch information) from the input device 208. In some implementations, a single device (e.g., a touchscreen) may include the display device 206 and the input device 208, and a single driver may include the display device driver 212 and the input device driver 214. Alternatively, the display device 206 and the input device 208 may be separate devices, and the display device driver 212 and the input device driver 214 may be separate drivers.

The memory 210 stores four open windows 218.1-4. While four open windows 218.1-4 are illustrated, the subject technology may include any number of open windows. Each of the four open windows 218.1-4 may have a corresponding application, for example, an email application, a calendar application, a browser, a music player, a spreadsheet application, a document processor application, a game playing application, etc. Each of the four open windows 218.1-4 may correspond to a window on which there is focus, a window on which there is not focus and which is not minimized, or a minimized window.

As shown, the open window 218.3 includes three open tabs 220.1-3. The open tabs 220.1-3 may be tabs in an application corresponding to the open window 218.3. For example, the open tabs 220.1-3 may correspond to separate pages in a browser window, separate sheets in a spreadsheet window, separate documents in a document processor window, etc., where each page, sheet, or document has a corresponding tab. While three open tabs 220.1-3 are illustrated, the subject technology may be implemented with any number of open tabs in the open window 218.3. While one open window 218.3 is illustrated as having multiple open tabs 220.1-3, the subject technology may be implemented with any number of open windows having multiple open tabs.

The window overview presentation module 216, when executed, causes the processing unit 202 to provide, via the display device 206, an overview of the open windows 218.1-4 and the open tabs 220.1-3 at the computing device 200. Examples of the operation of the window overview presentation module 216 are described in greater detail in conjunction with FIG. 3, below.

Figure 3:
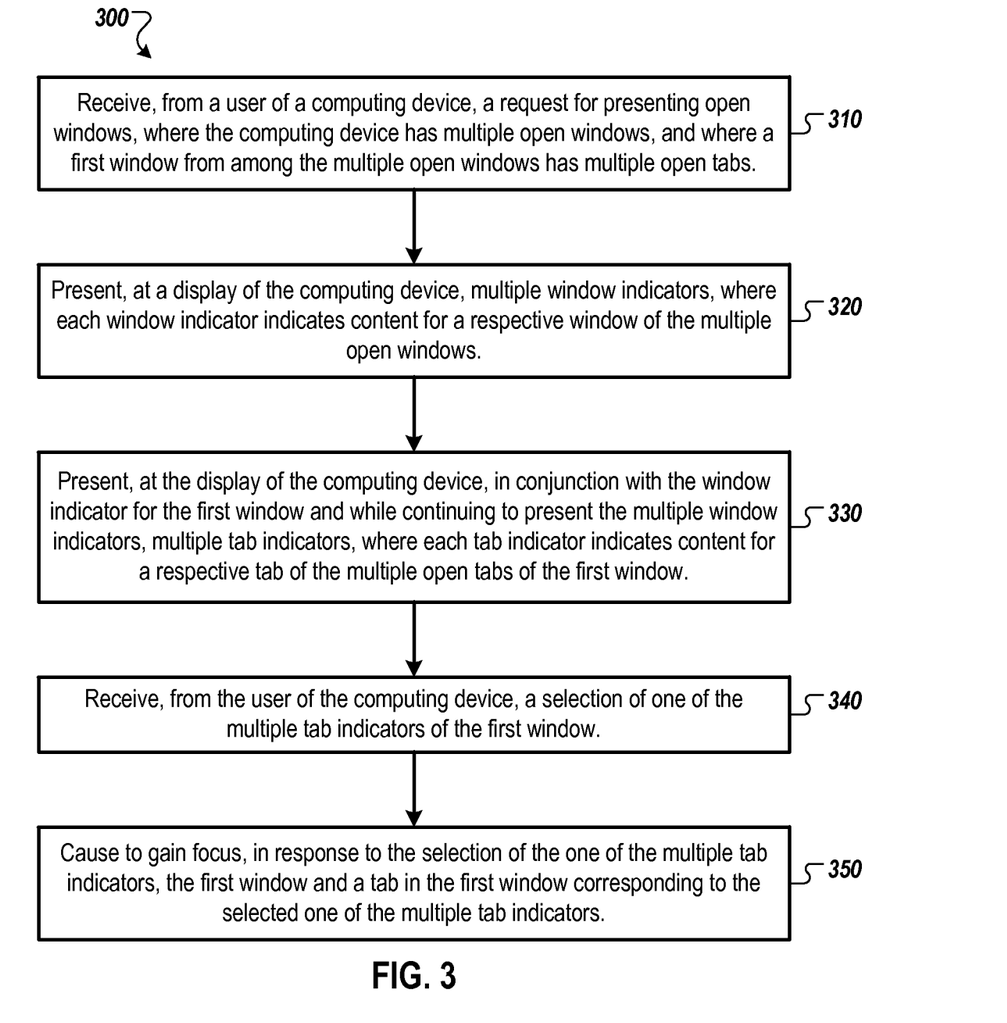
FIG. 3 illustrates an example process by which an overview of open windows and tabs may be presented.

FIG. 3 illustrates an example process 300 by which an overview of open windows and tabs may be presented.

The process 300 begins at step 310, where a computing device (e.g., computing device 200, via operation of the window overview presentation module 216) receives, from a user of the computing device, a request for presenting open windows, for example, in a window overview mode. For instance, the user may select a hotkey or a button on a keyboard or a touchscreen for entering the window overview mode. In some implementations, the request for presenting open windows includes a user placing three fingers on a trackpad or a touchscreen of the computing device and scrubbing the three fingers in a predetermined direction, e.g., downward or toward the user. Scrubbing the three fingers may refer to moving the three fingers along the trackpad without lifting the fingers off the trackpad. The computing device has multiple open windows, and a first window from among the multiple open windows has multiple open tabs. The first window may be a window from a browser application, a window from a document processor application, a window from a spreadsheet application, or a window from any other application. Other window(s), in addition to the first window, may also have multiple open tabs. Other window(s) may have a single open tab or may not implement tabs.

In step 320, the computing device presents, at a display of the computing device, multiple window indicators (e.g., window indicators 110A, 120A, 130A, and 140A). The computing device or a processing unit of the computing device may signal the display device to present the window indicators. A signal for presenting the multiple window indicators may be transmitted to the display device via a display device driver of the computing device. Each window indicator indicates content for a respective window of the multiple open windows at the computing device. In some implementations, a window indicator includes a thumbnail of the content of the respective window.

In step 330, the computing device presents, at the display of the computing device, in conjunction with the window indicator for the first window and while continuing to present the multiple window indicators, multiple tab indictors (e.g., tab indicators 132A, 134A, and 136A). The computing device or a processing unit of the computing device may signal the display device to present the tab indicators. A signal for presenting the multiple tab indicators may be transmitted to the display device via a display device driver of the computing device. Each tab indicator indicates content for a respective tab of the multiple open tabs of the first window. In some implementations, a tab indicator includes a thumbnail of the content of the respective tab. In some cases, the tab indicators are presented in response to a user hovering a cursor (e.g., cursor 150C) over the window indicator for the first window. Alternatively, the tab indicators may be presented in response to a tap or a single touch, on a touchscreen, of the window indicator for the first window. In yet another alternative, the tab indicators may be presented automatically when the window indicators are presented, without any additional user input for requesting the tab indicators.

The window indicators may be presented along a first line extending in a first direction (e.g., a horizontal direction in FIG. 1A or a vertical direction in FIG. 1C). The tab indicators presented in conjunction with the first window may be presented along a second line extending in a second direction (e.g., a vertical direction in FIG. 1A or a horizontal direction in FIG. 1C) different from the first direction.

In step 340, the computing device receives, from the user, a selection of one of the multiple tab indicators of the first window. The user may click the selected one of the multiple tab indictors using a mouse or touch the selected one of the multiple tab indicators using a touchscreen.

In step 350, the computing device, causes to gain focus, in response to the selection of the one of the multiple tab indicators, the first window and a tab in the first window corresponding to the selected one of the multiple tab indicators. After step 350, the process 300 ends.

As described above, the steps 310-350 of the process 300 are carried out in a predetermined order and in series. However, the steps 310-350 of the process 300 may be carried out in any order. In some implementations, two or more of the steps 310-350 of the process 300 are carried out in parallel. Also, in some cases, one or more of the steps 310-350 may not be implemented. For instance, steps 310-330 or steps 320-330 may be implemented without implementing steps 340-350.

Some implementations are described herein in conjunction with multiple windows having multiple tabs. However, in some cases, an application (e.g., a browser) may have multiple windows, and some of the multiple windows associated with the application may have multiple tabs. Alternatively, an application may be said to have multiple tabs or a window of an application may be said to have multiple tabs. Some examples of the subject technology are described herein as being implemented at a laptop computer. However, the subject technology may be implemented at any computing device, for example, a desktop computer, a tablet computer, a mobile phone, a personal digital assistant (PDA), an electronic music player, etc.

Figure 4:
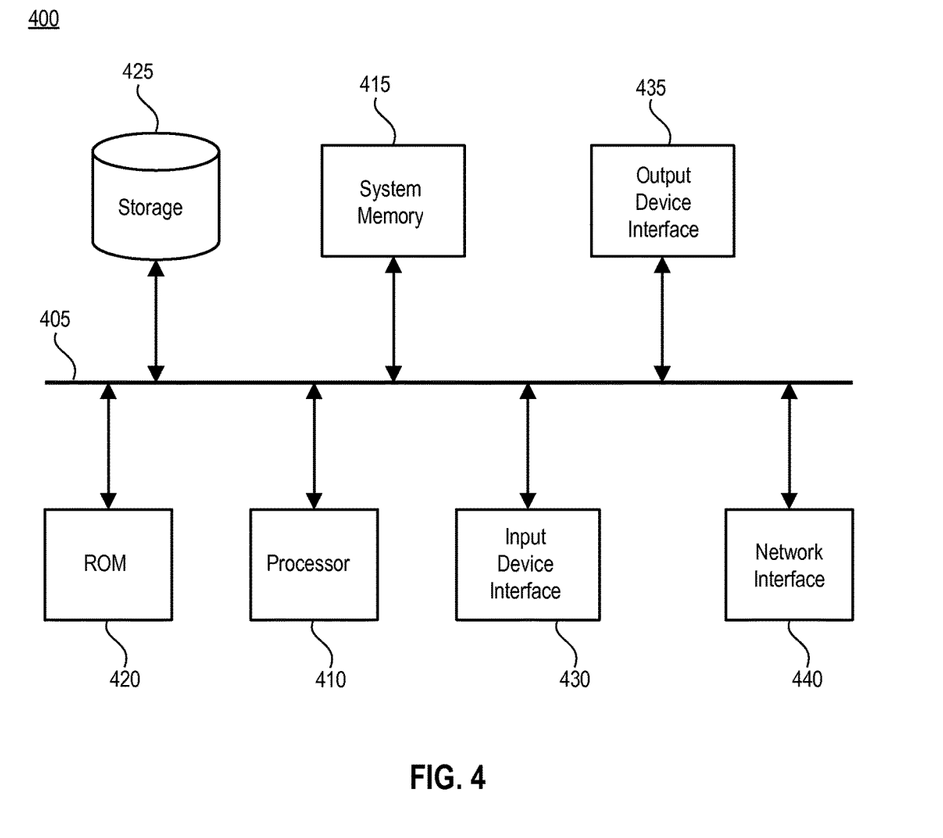
FIG. 4 conceptually illustrates an example electronic system with which some implementations of the subject technology are implemented.

FIG. 4 conceptually illustrates an electronic system 400 with which some implementations of the subject technology are implemented. For example, the computing device 200 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for presenting open windows and tabs in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touch screen that functions as both input and output devices.

Finally, as shown in FIG. 4, bus 405 also couples electronic system 400 to a network (not shown) through a network interface 440. In this manner, the electronic system 400 can be a part of a network of computers (for example a local area network (LAN), a wide area network (WAN), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method comprising:
   generating for a display of a computing device, a user interface, the user interface including,
      a plurality of window indicators that display content for a respective window of a plurality of open windows,
      a plurality of open tabs associated with at least one window in the plurality of open windows, each tab corresponding to content accessed in an application associated with the at least one window; and
   triggering display of a modification of the user interface, the modification including removing the plurality of tabs from along a top edge of the at least one window, and distributing the plurality of tabs for display within the at least one window, wherein each tab distributed for display is enlarged to include at least a title and a thumbnail image of the content accessed in the application.

2. The method of claim 1, further comprising:
   receiving, from a user of the computing device, a request for presenting the open windows, the request including a placement of three fingers on a trackpad of the computing device and a scrubbing of the three fingers in a predetermined direction.

3. The method of claim 1, further comprising:
   receiving, from a user of the computing device, a request for presenting an overview mode, the request including a select and hold action performed on a browser window indicator corresponding to the at least one window; and
   in response to receiving the request, presenting the window indicators arranged in a pyramid-like structure in the user interface.

4. The method of claim 1, wherein the window indicators are presented along a first line extending in a first direction, and wherein the enlarged tabs presented in conjunction with the at least one window are presented along a second line extending in a second direction different from the first direction.

5. The method of claim 1, further comprising:
   receiving an input corresponding to hovering a cursor over the window indicator for the at least one window, wherein presenting the plurality of tabs is in response to the received input corresponding to hovering the cursor over the window indicator for the at least one window.

6. The method of claim 1, further comprising:
   displaying, for each of the plurality of window indicators, a thumbnail image and text displaying a portion of the content of the respective window.

7. A non-transitory computer-readable medium comprising instructions which, when executed by a computing device, cause the computing device to implement a method, the method comprising:
   signaling a display unit to present a window that indicates a plurality of open browser tabs, each browser tab corresponding to content accessed in a web browser application associated with the window; and
   signaling the display unit to present a modified display of the window and the plurality of browser tabs, the plurality of browser tabs being removed from display along a top edge of the window and distributed for display within the window, wherein each browser tab being distributed for display is enlarged to include at least a title and a thumbnail image of the content accessed in the web browser application.

8. The non-transitory computer-readable medium of claim 7, the method further comprising:

receiving, from a user of the computing device, a request for presenting the modified display of the window, the request including a placement of three fingers on a trackpad of the computing device and a scrubbing of the three fingers in a predetermined direction.

9. The non-transitory computer-readable medium of claim 7, further comprising receiving, from a user of the computing device, a request for presenting an overview mode, the request including a select and hold action performed on a browser window indicator corresponding to the window.

10. The non-transitory computer-readable medium of claim 7, wherein the browser tabs are presented in conjunction with the window along a line extending in a first direction, and a plurality of additional windows being accessed are presented along a second line extending in a second direction.

11. The non-transitory computer-readable medium of claim 7, the method further comprising:
receiving an input corresponding to hovering a cursor over the window, wherein signaling the display unit to present the plurality of browser tabs is in response to the received input corresponding to hovering the cursor over the window.

12. The non-transitory computer-readable medium of claim 10, further comprising:
displaying, for the window and for each of the plurality of additional windows, a thumbnail image and text displaying a portion of the content of the respective window.

13. The non-transitory computer-readable medium of claim 7, wherein signaling the display unit to present the modified display of the window comprises:
transmitting, to the display unit and via a display driver, a signal for displaying the modified display of the window.

14. A computer comprising:
an input device;
a display device;
one or more processors; and
a memory comprising instructions which, when executed by the one or more processors, cause the one or more processors to implement a method, the method comprising:
receiving, via the input device, a request for presenting open windows;
determining which of a plurality of windows is open on the computer;
presenting, at the display device, a plurality of window indicators, wherein each window indicator indicates content for a respective window of a plurality of open windows, and
presenting, in a first window from among the plurality of open windows, a plurality of open tabs, each tab corresponding to content accessed in an application associated with the first window;
triggering removal of the plurality of open tabs from along a top edge of the first window; and
generating a plurality of tab indicators, the plurality of tab indicators corresponding to at least one of the plurality of open tabs, wherein the plurality of tab indicators are generated for display within the first window, each tab indicator being enlarged to include at least a title and a thumbnail image of the content accessed in the application.

15. The computer of claim 14, wherein the input device comprises a multi-touch trackpad, and wherein the request for presenting the open windows comprises a placement of three fingers on the multi-touch trackpad of the computing device and a scrubbing of the three fingers in a predetermined direction.

16. The computer of claim 14, the method further comprising:
receiving, via the input device, a selection of one of the plurality of tab indicators; and
causing to gain focus, in response to the selection of the one of the plurality of tab indicators, a tab corresponding to the selected one of the plurality of tab indicators.

17. The computer of claim 14, wherein the window indicators are presented along a first line extending in a first direction, and wherein the tab indicators presented in conjunction with the first window are presented along a second line extending in a second direction different from the first direction.

18. The computer of claim 14, the method further comprising:
receiving, via the input device, an input corresponding to hovering a cursor over the window indicator for the first window, wherein presenting the plurality of tab indicators is in response to the received input corresponding to hovering the cursor over the window indicator for the first window.

19. The method of claim 1, wherein the at least one window represents a web browser application window.

20. The method of claim 1, wherein the window indicators are arranged in a pyramid-like structure in the user interface.

* * * * *

UNITED STATES PATENT AND TRADEMARK OFFICE
CERTIFICATE OF CORRECTION

| | | |
|---|---|---|
| PATENT NO. | : 10,067,628 B2 | Page 1 of 1 |
| APPLICATION NO. | : 13/967290 | |
| DATED | : September 4, 2018 | |
| INVENTOR(S) | : Kuscher et al. | |

It is certified that error appears in the above-identified patent and that said Letters Patent is hereby corrected as shown below:

On the Title Page

Column 1, Item (71), In "Applicant", Line 1, delete "Moutain" and insert -- Mountain --, therefor.

Column 2, Item (74), In "Attorney, Agent, or Firm", Line 1, delete "Bellerman" and insert -- Bellermann --, therefor.

In the Claims

In Column 12, Claim 1, Line 2, delete "method" and insert -- method, --, therefor.

In Column 12, Claim 1, Line 4, delete "including," and insert -- including: --, therefor.

In Column 12, Claim 1, Line 6, delete "windows," and insert -- windows, and --, therefor.

In Column 13, Claim 9, Line 7, delete "comprising" and insert -- comprising: --, therefor.

In Column 13, Claim 9, Lines 7-10, delete "receiving,....window." and insert the same at Line 8 as a new point.

In Column 13, Claim 14, Line 37, delete "computer" and insert -- computer, --, therefor.

In Column 14, Claim 14, Line 4, delete "windows, and" and insert -- windows; --, therefor.

Signed and Sealed this
Fifteenth Day of January, 2019

Andrei Iancu
*Director of the United States Patent and Trademark Office*